United States Patent
Schiffmann et al.

[15] 3,699,899
[45] Oct. 24, 1972

[54] DOUGH PROOFING APPARATUS

[72] Inventors: Robert F. Schiffmann, Brooklyn; Ernest W. Stein; Harold B. Kaufman, Jr., both of New York, all of N.Y.

[73] Assignee: DCA Food Industries, Inc., New York, N.Y.

[22] Filed: July 1, 1970

[21] Appl. No.: 51,545

Related U.S. Application Data

[63] Continuation-in-part of Ser. No. 649,610, June 28, 1967, abandoned.

[52] U.S. Cl. ............................. 107/57 C, 219/10.55
[51] Int. Cl. .............................................. H05b 9/06
[58] Field of Search ...................... 107/57; 219/10.55

[56] References Cited

UNITED STATES PATENTS

| | | | |
|---|---|---|---|
| 3,569,656 | 3/1971 | White | 219/10.55 |
| 3,440,385 | 4/1969 | Smith | 219/10.55 |
| 3,494,723 | 2/1970 | Gray | 219/10.55 X |

*Primary Examiner*—James R. Boler
*Attorney*—Amster & Rothstein

[57] ABSTRACT

An apparatus including a conveyor for moving cut pieces of yeast-containing dough. The conveyor subjects the dough pieces to at least two microwave heating periods separated by a "rest" period. Alternatively, a similar heating sequence is achieved by appropriately programming a microwave energy source. Typically, the dough pieces are first heated for a period of 5 to 180 seconds to raise the dough temperature to between 90° F. and 120° F. Heating of the dough pieces is then stopped for 20–180 seconds to permit temperature equilibration. Thereafter, the dough pieces are heated again for a period not exceeding 3 minutes to a temperature between 100° F. and 130° F. During both heating intervals, the power density within the microwave cavity, as measured in terms of the heating of "conductivity water," is in the range 0.128–12.4 watts/gm. Such a sequence allows the dough pieces to uniformly rise to an optimum volume in a relatively short time.

46 Claims, 11 Drawing Figures

DOUGH PROOFING APPARATUS

This application is a continuation-in-part of application Ser. No. 649,610 filed on June 28, 1967, now abandoned.

This invention relates to apparatus for the production of baked products, and more particularly to apparatus for proofing yeast-leavened dough.

In the production of yeast-raised bakery products, as typified by yeast-raised doughnuts, a yeast-containing dough mass of suitable composition is worked by kneading at room temperature to develop the gluten to an optimum viable state. The mass then is divided or extruded into pieces of the desired shape and size. The pieces of dough are stored under closely controlled ambient conditions of temperature and humidity for a period of the order of about 15 to 75 minutes to cause the desired raising of the dough as a consequence of the generation and expansion of gases in the dough due to the yeast and enzymatic activity, and to produce other desired effects such as maturing of the gluten and formation of a uniform skin (all hereinafter referred to when the term "gassing" is used). In large commercial operations the production of the baked product is achieved in a continuous manner and the proofing is accomplished by depositing groups of the dough pieces onto consecutive trays and transporting the successive trays through a proofing chamber or cabinet maintained under controlled conditions of temperature and humidity.

This procedure possesses many drawbacks and disadvantages. By reason of the long storage time required to effect the desired raising of the dough, the equipment is bulky, awkward, expensive and occupies large amounts of space, and the amount of in-process product in the proofing area is great so that any malfunctioning of the equipment, any processing or composition error, or any misadjustments may adversely affect the quality of large quantities of product.

Thus, the conventional continuous proofing equipment and the required accessory devices are expensive, of little versatility and adaptability and subject to malfunctioning, and the procedures employed with such equipment are highly inflexible, and frequently result in products of inferior quality.

In conventional proofing, the dough pieces are placed in a proofing box whose temperature is approximately 130° F. The ambient temperature causes the dough temperature to rise and the yeast to start gassing. Since the rise in dough temperature results from heat conduction only, the process is relatively slow. Furthermore, the ambient temperature which is most suitable for the dough is under 130° F.; too high a temperature dries out the skin.

To overcome the aforesaid problems, it has been proposed in the prior art to accelerate the proofing by subjecting the dough pieces to a microwave field. The dough temperature rises at a fast rate in the microwave oven and there is rapid gassing of the yeast. But such prior art approaches have not been successful. The primary shortcomings were that it was observed at the end of the proofing process that there had been insufficient gassing (the dough pieces were not completely proofed), and "hot spots" were evident in the dough pieces (certain regions of the dough pieces were in effect partially baked relative to other regions and resulted in a non-uniform product after the final frying or baking step).

It is a principal object of the present invention to provide an improved apparatus for the production of baked goods.

Another object of the present invention is to provide an improved apparatus for the production of yeast-raised dough.

Still another object of the present invention is to provide an improved apparatus for the continuous raising of yeast-containing pieces of dough attendant the continuous production of baked and fried products.

A further object of the present invention is to provide an improved apparatus for the continuous raising of yeast-containing dough pieces characterized by extremely short processing time, uniformity and high quality of the resulting raised dough, relatively low cost and mechanical simplicity of the equipment, ease and wide range of adjustability for different products, and versatility, adaptability and reliability of the apparatus.

Apparatus constructed in accordance with the principles of our invention produces a raised dough by first exposing a yeast-containing dough to a high frequency field (preferably, microwave) for a first period of 5 to 180 seconds at a power density, as measured in terms of the heating of "conductivity water," in the range 0.128–12.4 watts/gm to raise the temperature of the dough to between 90° F. and 120° F., and then maintaining the dough for a second period of 20 to 180 seconds at a temperature between 90° F. and 120° F. The dough is then once again subjected to a microwave field having a power density in the same range for a third period not in excess of 180 seconds. Preferably, all of the microwave heating (during the first and third intervals) takes place in a microwave oven in which the ambient temperature is in the order of 100°–130° F. The ambient temperature insures the proper formation of a gas-retaining skin on the proofed dough.

The initial microwave heating of the dough rapidly raises its temperature to a level at which appreciable gassing of the yeast can take place. During the first heating interval, the power density of the microwave field can be even higher than some of the prior art microwave fields which were used to accelerate proofing. Even though these prior art fields (of even lower power densities) resulted in final products of non-uniform texture, this problem does not exist in the practice of our invention because the temperature of the dough is not raised to the final proofing temperature during the first step. The temperature is raised only to a level at which rapid proofing can begin.

During the second interval, when the microwave power is turned off, the dough is maintained at a temperature at which relatively fast gassing can take place. During this "rest" interval, the temperature of the dough equilibrates. At the end of the first heating interval, different regions of the dough are at different temperatures. During the rest interval, the various temperatures of the different regions of the dough come closer together. Thus not only does relatively fast proofing continue to take place during the rest period, but the dough temperature is made more uniform as well.

During the second microwave interval, the dough temperature rises rapidly to the final proofing temperature. This permits the complete proofing of the dough (frying or baking can begin immediately) as even more gas is generated by the yeast. Once again, the power density of the microwave field can be even higher than those levels which in the prior art microwave proofing gave rise to final products of non-uniform texture. It is true that during the final heating interval the various regions of the dough are raised to different temperatures. However, because at the end of the rest interval all regions of the dough were at more or less the same temperature, the relatively small rise from this temperature to the final temperature does not result in large enough deviations in temperature within the dough to produce any hot zones or partially baked zones.

It has been discovered that the developed yeast-containing dough treated in the above manner rapidly reaches a highly desirable raised state in a total microwave heating and intermediate rest period in the order of 25 to 360 seconds, in which state it is ready for baking. Our improved continuous equipment is extremely compact, even for very large capacities, and is easily and rapidly adjustable to optimally treat various types of yeast-containing dough to produce a desired end product. Moreover, inasmuch as the amount of dough present in the improved proofing equipment is small, any human error results in a minimum product loss.

The principles of our invention can be understood with reference to the first illustrative embodiment to be described below. The apparatus includes an endless conveyor belt. A dough piece forming and severing apparatus is located at the trailing end of the conveyor and operates to deposit regularly spaced rows of dough pieces onto the conveyor. Zones of a high frequency microwave field are established at the trailing end of the conveyor forward of the dough piece depositing station and adjacent to the discharge end of the conveyor, the leading and trailing field zones being separated by a substantially field-free zone, the field-free zone being held at a temperature approximately equal to the final proofing temperature. The field forming equipment may include a cavity extending along the length of the conveyor upper run and connected by a waveguide to a microwave generator. Tunnels defining microwave radiation attenuation traps afford passage of the belt through the cavity, and the field-free zone is achieved by positioning a shield-defining low metal tunnel along the conveyor run between the inner boundaries of the microwave field zones.

The dough treated by the apparatus of our invention advantageously contains a maturing agent in an amount of between 10 and 250 parts per million based on the weight of the flour. In addition, the dough advantageously contains a bromate, for example, potassium bromate, in an amount between 1 and 150 parts per million and a proteolytic enzyme in known and conventional concentrations, which may be introduced as inactive dry yeast. A dry mix containing the flour and maturing agent, and preferably the bromate and enzyme, is admixed with the other ingredients to form the dough, including the yeast, water and preferably sugar, shortening and additives such as flavoring, egg solids, milk solids and the like.

Further objects, features and advantages of our invention will become apparent upon consideration of the following detailed description in conjunction with the drawing, wherein.

Figure 1:
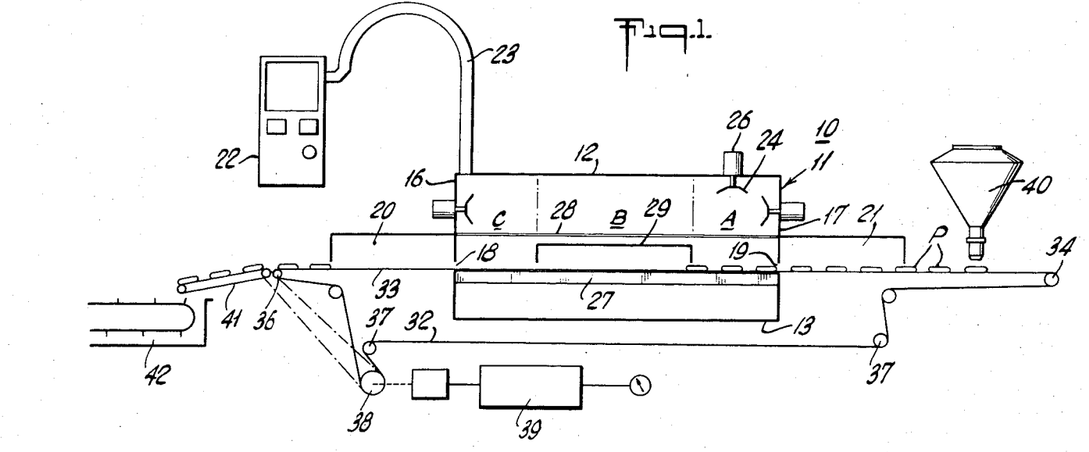
FIG. 1 is diagrammatic longitudinal sectional view of a first illustrative embodiment of our invention.
Figure 2:
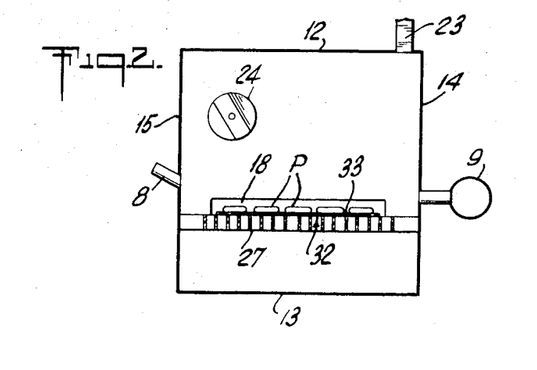
FIG. 2 is a transverse sectional view of the apparatus of FIG. 1.

Referring to FIGS. 1 and 2, reference numeral 10 generally designates the first illustrative apparatus which comprises a cavity-defining metal chamber 11 including top and bottom horizontal rectangular walls 12 and 13 respectively, rectangular longitudinally extending vertical side walls 14 and 15, and leading or front and trailing or rear transversely extending vertical rectangular end walls 16 and 17 respectively. Formed in the front and rear end walls 16 and 17 are horizontal outlets and inlet slots 18 and 19 of a height and width sufficient to permit the passage of a belt conveyor loaded with dough pieces to be treated. In order to attenuate the microwave radiation leaking from the cavity 11 through slots 18 and 19 to a permissible level there are provided elongated radiation attenuation metal tunnels 20 and 21 which extend longitudinally outwardly from end walls 16 and 17 in registering alignment with slots 18 and 19, of dimensions to permit passage of dough pieces of the desired size and to attenuate sufficiently radiation from cavity 11.

A high frequency generator 22 has its output coupled in any suitable manner to the upper part of cavity 11 as by means of a connecting waveguide 23. The frequency of the output of generator 22 is in the range between 1 and 100,000 megacycles, for example, 2,450 megacycles, and the generator is provided with controls for adjusting the power output. Preferably, the oven is operated in the microwave frequency range. A plurality of mode disturbers 24 of known construction are positioned throughout cavity 11 and are rotated by corresponding externally mounted motors 26 to change the wave patterns within cavity 11.

Extending between the bottom edges of slots 18 and 19 are a plurality of suitably supported laterally spaced longitudinally extending parallel slats 27 of low loss dielectric material, for example, polystyrene or the like. A rectangular horizontal panel 28, likewise formed of a low loss dielectric material, is supported in cavity 11 at a short distance above the upper edges of slots 18 and 19 and is substantially coextensive with the cavity walls. Panel 28 restricts the volume of the passageway through the cavity 11 containing the atmosphere therein and facilitating maintenance and sanitary conditions without interfering with the high frequency electric field.

In order to establish a field-free zone within cavity 11 a longitudinally extending metal tunnel 29 is positioned on slats 27 between and spaced from end walls 16 and 17 and in longitudinal alignment with slots 18 and 19 and having a passageway of a transverse cross-section corresponding to the shape of slots 18 and 19. Tunnel 29 is preferably of adjustable length and longitudinally adjustable and divides the path through the cavity into a rear high frequency heating zone A, an intermediate substantially field-free zone B, and a front high frequency heating zone C, the zones being of adjustable length. It should be noted that there is some leakage of the high frequency field into zone B but this is of a relatively low intensity and effects little or no heating in zone B. If desired, tunnel 29 may be adjusted in dimensions to permit sufficient field therein to effect a reduced predetermined heating of the dough conveyed therethrough. Tunnel 29 is formed of jacketed walls containing water or other energy absorbing material (as will be described with reference to FIG. 3). A conveyor belt 32 includes an upper run 33 which advances from an upper rear drum 34 trailing tunnel 21, through tunnels 21, 29, and 20 along the bottom walls thereof, and along the upper faces of slats 27 in zones A and C to a leading drum 36 forward of tunnel 20, belt 32 being substantially the width of the tunnels. In its return run, belt 32 traverses a path external of cavity 11 about a plurality of guide rolls 37 and about the periphery of a drive drum 38. Drum 38 is connected to a variable speed drive motor 39 which effects the advance of belt 32 along its upper run 33 at an adjustable speed. Belt 32 is formed of a porous woven web and may be formed of other materials, for example, Teflon coated woven cotton, glass fibers, or the like. An environmental control system, represented by the numeral 9, maintains the oven at the proper temperature (100°–130°F.) and humidity (50–90 percent) levels. The dough pieces inside the oven can be observed through viewing ports 8.

A dough extruding and cutting device 40 of known construction for cutting doughnut shaped pieces of dough is positioned above the trailing section of the belt run 33 and may be of the type described in U.S. Pat. No. 3,152,560, granted Oct. 30, 1964. The device 40 may be provided with a plurality of laterally spaced extrusion and cutter heads and may be transversely reciprocated. Belt 32 may be intermittently advanced and synchronized with the device 40 so as to deposit successive equally spaced transverse rows of dough pieces P on the belt upper run 33. At the leading end of belt upper run 33 there is provided a downwardly forwardly inclined endless conveyor which extends from a point adjacent the leading end of conveyor run 33 to the trailing end of continuous deep frying unit 42 which may be of the construction described in U.S. Pat. No. 2,709,955, granted June 7, 1955. Conveyor 41 is synchronously driven with conveyor 32 and transfers dough pieces P discharged from the leading end of conveyor run 33 to frier unit 42.

In the operation of the apparatus, the speed of belt 32, the power output of generator 22 and the length and position of tunnel 29 are adjusted to achieve the operating conditions and parameters earlier set forth. These adjustments depend on the rate of treatment, the dough composition and other variables (such as total dough weight in the oven), and the proper adjustments may be easily and readily determined and effected.

Dough treated in the apparatus of FIGS. 1 and 2 advantageously contains a maturing agent and is advantageously produced from a dry mix comprising flour containing between 10 and 250 parts per million of a maturing agent, preferably azodicarbonamide, although other known agents may be employed. The dry mix also advantageously contains 1 to 150 parts per million of a bromate, for example, potassium bromate, and the like. In the production of yeast raised doughnuts, the dry mix may contain 2 to 12 parts sugar, 60 to 85 parts flour, 2 to 10 parts shortening, 1 to 3 parts milk solids, one-fourth to 2½ parts salt, egg solids, and other additives including the maturing agent, bromate, and enzymes. In producing the dough the dry mix is admixed with 50 percent water, based on weight of dry mix, and is worked in the known manner to develop the gluten or dough to the optimum amount and the developed dough is loaded into device 40 where it is extruded and cut into dough pieces P.

The following is a specific example of a dry mix which may be employed in the production of yeast raised doughnuts:

| Ingredients | Parts |
| --- | --- |
| Flour (wheat) | 76 |
| Sugar | 7 |
| Shortening | 6.5 |
| Dry Egg Yolk | 2 |
| Salt | 1.25 |
| Non Fat Dry Milk | 2 |
| Emulsifier | 2 |
| Baking Powder | 2 |
| Potassium Bromate | 70 ppm.* |
| Maturing Agent | 100 ppm.* |
| Defatted Soya Flour | 1.25 |
| Inactive Dry Yeast | 0.001 |

*Based on weight of flour.

In accordance with a specific construction of apparatus 10, cavity 11 is 79 inches long, 35 inches wide, and 35½ inches high. Tunnels 20 and 21 are 2 inches high and 35 inches wide, and tunnel 29 is 2 inches high and 28 inches wide and the belt run 33 is positioned 11⅞ inches above the cavity bottom wall 13. The tunnel 29 is adjusted to make zones A, B, and C, 25 inches, 41 inches, and 13 inches long respectively, it being noted that zones A, B and C are advantageously adjustable respectively between 10 and 40 inches, 10 and 60 inches, and 10 and 40 inches.

The following example is given by way of illustration:

A dough is prepared by mixing 30 pounds of the dry mix specified above with 15 pounds water and 2 pounds compressed yeast, the dough being worked by a planetary mixer for a period of 12 minutes to develop the gluten in the known manner. The dough is loaded in the hopper of the extruding and cutting device 40 and motor 39 is energized to drive belt 32 at a speed of about 0.70 inches per second. Successive rows of toroidal dough pieces P are deposited on the belt run 33, the dough pieces weighing 1⅛ ounces each, arranged two on a row, the center to center distance between successive rows being 4 inches. Generator 22 produces a field of a frequency of 2,450 megacycles per second and is adjusted to a power output of 1.5 kilowatts. The dough pieces are conveyed through zone A where they are exposed to the high frequency field for a period of about 35 seconds, traverse the substantially field-free zone B for a period of about 58 seconds, and are then exposed to the high frequency field in zone C for a period of about 17 seconds. The temperature of the dough pieces entering zone A is about 80° F. and leaving zone A and entering zone B their temperature is about 100° F.; the dough pieces P leave zone B and enter zone C at a temperature of about 100° F., and leave zone C in a substantially fully raised condition at a temperature of about 120° F. The raised dough is discharged from conveyor belt 32 onto conveyor 41 and then into frier 42, the time between zone C and the frier being about 90 seconds (due to conveyor delay) and the temperature of the dough pieces as they reach frier 42 is about 120° F.

The dough pieces P when they reach frier 42 are uniformly expanded to optimum volume with a smooth non-porous skin and in all appearances resemble conventionally proofed dough pieces, and the fried cakes or end product are of large volume (160–190cc), low density (0.25 to 0.20 gm/cc) having a smooth golden-brown crust and white midline, and an even celled interior structure.

Heating the dough in this manner greatly shortens the proofing time. The reason for the field-free or rest zone is that in the first heating zone the dough pieces heat unevenly; the intermediate rest zone allows the temperature of each dough piece to equilibrate. The microwave input to the rest zone is low enough and the rest period is long enough to allow the temperature of each dough piece to become uniform to the point where the maximum temperature at any point in a dough piece at the end of the rest period is less than 20 percent greater than the average temperature; preferably, the maximum temperature at any point is no more than 5 percent greater than the average temperature. Similarly, the minimum temperature at any point in a dough piece is less than the average temperature by no more than 20 percent, and preferably is less than the average temperature by no more than 5 percent.

While the temperature deviations in any dough piece when it leaves the first heating zone may be much greater than 20 percent, the deviations are greatly reduced by the time the dough leaves the rest zone. The reason for allowing the temperature of each dough piece to become more uniform in the rest zone after the first heating period is that a widely varying temperature within any dough piece would give rise to a non-uniform density of the finished product; the different parts of the dough piece would expand to different extents during the subsequent heating of the dough piece in the last phase of the proofing process and during frying.

Figure 10:
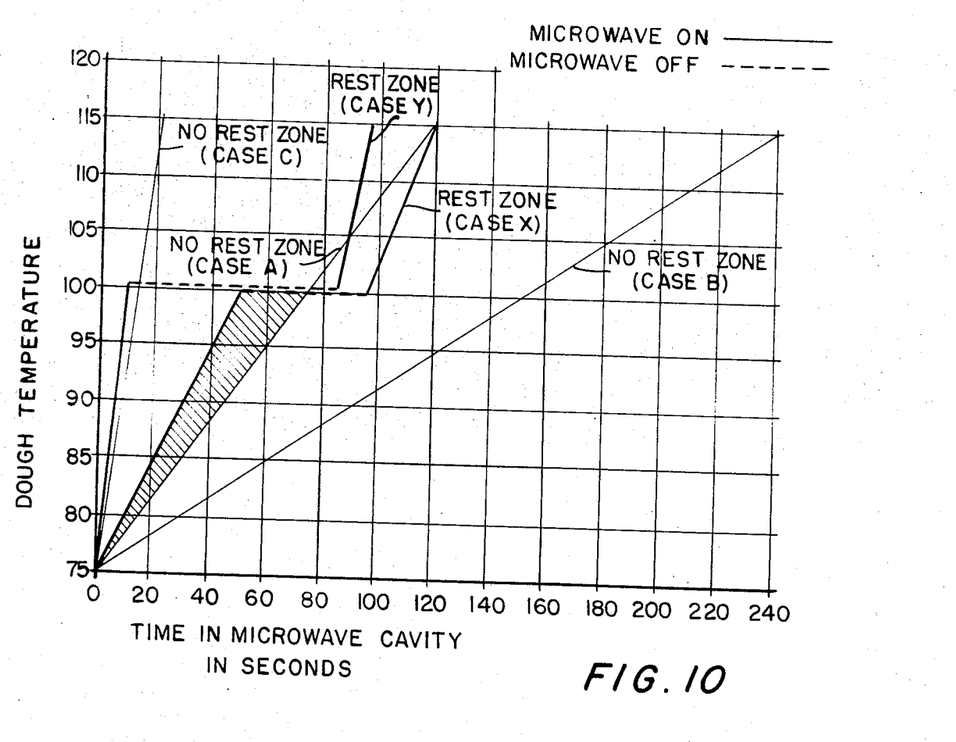
FIG. 10 is a plot of average dough temperature versus time for a typical example—doughnuts—and will be helpful in understanding the principles of our invention.

The advantages of providing rest zones can be understood only after the proofing process itself is considered in detail. FIG. 10 which illustrates several proofing sequences will be helpful in this regard.

In the microwave proofing of yeast raised dough pieces, highly satisfactory results are obtained by keeping the power input to the dough at fairly low levels. Although it is possible to raise the dough temperature to the final proofing temperature in just a few seconds, the resulting product exhibits several severe drawbacks: non-uniformity of dough temperature thereby leading to partially baked areas next to cool areas (further leading to non-uniformly expanded finished products); incompleteness of gas generation since the rise in temperature is faster than the metabolic rate at which yeast generates carbon dioxide; incompleteness of maturation of gluten, also due to improper kinetics; and incompleteness of skin formation on the dough piece, thereby not enabling the shaped piece to retain all of its gas and arrive at a maximum volume.

For these reasons, lower microwave power densities and longer proofing times appear necessary. However, high power densities can be used, thereby shortening the proofing time, in accordance with the principles of our invention by providing rest zones. During the period of interruption (i.e., rest period), the dough experiences either no field at all or only an extremely weak field so as to maintain its average temperature or allow it to increase by only a very few percent. The purpose of this rest period is to allow all non-uniformities in the dough temperature to equilibrate to a medium temperature and to allow all the chemical and physical reactions which occur in proofing to take place at a higher temperature which is kinetically more favorable to the proofing process. This is of great significance since it allows the total proofing time to be shorter than that which would result by any technique which employs continuous exposure to a microwave field followed by immediate baking or frying. Reference to FIG. 10 will make this clear.

The use of a rest zone as in "case X" allows the dough to see initially a higher and more favorable thermal profile than in the "no rest zone, case A" situation in which the same total proofing time is experienced. The improved thermal profile is emphasized by the shaded area which shows higher temperatures reached earlier for the rest zone case. "No rest zone, case B" (low power) demonstrates the much longer period of microwave exposure required in order to obtain proofing quality equivalent to "rest zone, case X." A proofer for case B is relatively costly in terms of hardware and floor space since it must generally be twice as long as a proofer employing the rest zone of case X.

"No rest zone, case C" shows that it is possible to achieve the final proofing temperature very rapidly using high power density. However, the resulting product is highly unsatisfactory as mentioned above. This case is an example of the prior art techniques.

In the "rest zOne, case Y" example, successful proofing is achieved using high power densities, higher in fact than in the "no rest zone, case C" situation. However, an important difference exists, namely, that the product is removed from the high frequency field before any portion of the dough has reached a temperature at which either yeast is killed or flour protein is denatured (i.e., temperatures are maintained at or below 130° F., with the average temperature closer to 100° to 110° F.). The rest period allows the temperature to equilibrate and all the proofing reactions to take place. It is to be noted, however, that the large thermal gradients created in the dough by such fast initial heating make it necessary to extend the rest zone period to almost twice that in the "rest zone, case X" example since longer equilibration time will be required and also because virtually none of the proofing reactions will have occurred in the initial heating period and must occur in the rest period. Equipment for proofing as shown by the "rest zone, case Y" example is more costly in its power generator and has much more non-high frequency field "dead space" than equipment for proofing in accordance with "rest zone, case X."

A further advantage is to be gained from the use of equipment for proofing in accordance with "rest zone, case X" rather than either "no rest zone, case C" or "rest zone, case Y," especially where the equipment employs a continuously moving conveyor. In the first case the high frequency cavity, if it is a resonant multimode or traveling waveguide type structure, will be larger than in the latter two cases. This is an important difference since it is much easier to provide heating uniformity over the entire high-frequency product zone where the cavity is large than where it is small. It is of course important that such uniformity be experienced by all shaped dough pieces in the high-frequency field.

The power densities experienced during the proofing process may be expressed in several different fashions, each of which has its advantages in describing the process or apparatus for carrying it out. In a description of the apparatus it is advantageous to discuss power density in terms of the power required to heat a unit volume or unit weight of "conductivity water" (this is water which either through special distillation procedures, or ion-exchange resin techniques, has been reduced in ion content to a specific conductance of the order of $1 \times 10^{-6}$ ohm$^{-1}$ cm$^{-1}$ or less), since such water is a standard material whose dielectric properties are well known. Reference may be made to "Dielectric Materials and Applications" by A. R. Von Hippel, M.I.T. Press, 1954, which lists the dielectric constant and loss tangent for conductivity water over a wide range of frequencies and temperatures. Once the power density required to heat this standard material is known, it is possible for one skilled in the art to determine the field strength required in the high frequency apparatus to provide the necessary power density at any frequency by employing the following relationship:

$$P/V = E^2 K (\tan \delta) 2\pi f e_o \qquad (1)$$

where $P$ = power generated in conductivity water
$V$ = volume of conductivity water
$E$ = field strength
$K$ = relative dielectric constant of conductivity water
$\tan \delta$ = loss tangent of conductivity water
$f$ = frequency of the high-frequency generator
$e_o$ = dielectric constant of air $\left(\dfrac{10^{-9}}{36\pi} \dfrac{\text{farad}}{\text{meter}}\right)$ The processing time is the total time during which conductivity water would experience the high frequency field during the normal operation of the apparatus as a proofer. This time (exclusive of rest zones) may be given in a broad range as 25–360 seconds, with a preferred range of 60–240 seconds. Similarly, the desired temperature rise in the water would be from 20° to 60° F. (11.1° to 33.3°C) in the broad range and 30°F to 40°F (16.7°C to 22.2°C) in the preferred range. The power densities in these cases are as follows:

broad range:   0.128–12.4 watts/gm.
preferred range:   0.293–1.55 watts/gm.

The field strength required in the conductivity water can be computed from equation (1) for any particular frequency. At the S-band microwave frequency of 2,450 megahertz, for example, the field strengths in the conductivity water are:

broad range:   $(3.4 \times 10^2) - (3.0 \times 10^3)$ volts/meter.
preferred range:   $(4.6 \times 10^2) - (1.1 \times 10^3)$ volts/meter.

One can also estimate the field strength in the air surrounding the water by standard techniques utilizing correction for the geometry of the heating mass, as described for example in Page and Adams, "Principles of Electricity." If the sample geometry chosen is that of a cylinder whose axis is approximately as long as its diameter, as would be experienced in a standard Pyrex beaker, then the field strength in air would be computed as follows:

$$e_{air} = \frac{K+2}{3} e_{water}$$

where K is the dielectric constant of water   (2)

This leads to field strengths in air of:

broad range:   $(8.4 \times 10^3) - (7.4 \times 10^4)$ volts/meter.
preferred range:   $(11.3 \times 10^3) - (2.6 \times 10^4)$ volts/meter.

By restricting the field strength in air in the high frequency heating device to those ranges given above, and employing periods of exposure to the high frequency field and one or more rest periods of the proper durations, excellent proofing results are obtained.

It should be noted that the use of a high relative humidities in the proofing apparatus, as well as an elevated ambient temperature close to that of the final temperature of the proofed material, limits evaporation to very low levels; there is then very little heat loss due to evaporation.

A similar analysis may be employed to establish the requirements of the proofing apparatus at any other frequency. As is known in the art, too low a frequency is undesirable because the field strength must be so large that it can cause arcing or corona discharge in the air or the material to be heated; too high a frequency results in the penetration depth being small by comparison to product size. Although standard microwave oven frequencies have been used successfully, it is to be expected that a broad range of frequencies can be used depending on the particular product.

Rather than to consider power densities in a standard material such as conductivity water, it is possible to consider the power densities in the material to be processed itself, i.e., yeast leavened dough. In this case, yeast leavened dough does not exist as a universally standard material and any change to its ingredient make-up will affect its dielectric properties as well as its thermal and all other physical and chemical properties to some extent. Fortunately, however, most of the effects are small; it is thus possible to delineate the parameters to achieve the required power densities in the dough within the proper time periods. Once again use may be made of equation (1) above in order to establish the field strengths required; but the calculations become far more complicated since the relative dielectric constant and loss tangent are dependent upon frequency as well as temperature of the dough, and no data exists in the literature for these values over a wide spectrum of frequency.

However, experiments reveal that reasonable average values for yeast leavened dough are as follows: specific heat = 0.7 calories/gm °C, density = 0.59 gm/cc. Using these values, the following power density (in the product) ranges can be computed from experimentally observed temperature rises:

broad range: 0.089–9.7 watts/gm.
preferred range: 0.202–1.08 watts/gm.

The lower limit in the broad range results in slow heating of the dough. If the power density in the dough is this low value, only a very short rest period is required. The temperature-time curve is approximately that of "no rest zone, case B" in FIG. 10. The higher limit in the broad range results in a temperature-time curve as shown by "rest zone, case Y" in FIG. 10. The use of a higher power density can produce "hot spots" in the dough (resulting in a non-uniform baked product); the use of a lower power density is wasteful of time.

Using the above data, and values of K=36, tan $\delta$=0.07, Equation (1) may be utilized to determine the field strength within the dough at a typical S-band microwave frequency of 2,450 megahertz:

broad range: 38.2–1,220 volts/meter.
preferred range: 182–421 volts/meter.

The required field strengths at other frequencies may be calculated similarly with the use of Equation (1) and the correct values of K and tan $\delta$.

It has been found that finished products (after baking or frying) which have been proofed in accordance with the principles of our invention have densities which are the same, and sometimes even lower, than those of similar products proofed conventionally. This, of course, is necessary for a light and fluffy product.

The ambient conditions during proofing should be as follows:
relative humidity:
    broad range: 50–90%
    preferred range: 60–80%
temperature:
    broad range: 100°–130° F.
    preferred range: 105°–120° F.

The temperature should be comparable to the final proofing temperature in order to aid in the proper formation of a gas retaining elastic skin upon the shaped piece during proofing. It has also been found that these conditions limit the evaporative loss of water from the product so that whereas in conventional proofing between 3 percent and 10 percent of the water may be lost from the dough by the time it exits from the apparatus, in accordance with our invention the water loss is less than 3 percent and is generally less than 1 percent. This has two significant advantages. First, there is a power savings since there is virtually no demand made by latent heat of evaporation. Secondly, the higher water content in the dough generally yields higher water content in the finished product. The products are not only more tender, they have a much improved shelf life. It is possible to obtain a shelf life increase of 100 to 200 percent over conventionally proofed products in this manner. This is of great importance for many products since many of them have in the past had only 1 or 2 days shelf life making it commercially impossible to market them for wholesale distribution. Products proofed in accordance with our invention, having a longer shelf life, thus have an important advantage over conventionally proofed products.

The relative humidity range above is desirable in most cases. In a few, where a drier skin is necessary, the humidity should be lowered.

It should be noted that if a very strong continuous field is used ("no rest zone, case C," in FIG. 10), the dough must be allowed to rest for a long period after proofing to allow temperature equilibration and full gassing. The dough temperature is raised so fast that gassing is not complete by the time the final proofing temperature is reached. In the case of the weakest continuous field which is not wasteful of time ("no rest zone, case B," in FIG. 10), not only are hot spots not present by the time the final proofing temperature is reached, but the gassing has been completed as well. Thus frying or baking can start immediately. If a continuous field somewhere between the two extreme cases is used ("no rest zone, case A" in FIG. 10), the dough temperature rises to the final proofing temperature in a time somewhere between the two extreme limits. If the field is not too strong, no hot spots are observed. Nevertheless, a rest period must be provided in order to allow complete gassing before frying can begin.

The problem with continuous proofing with a weak field is that it takes relatively long to complete proofing (even though there is a vast improvement over conventional proofing time). This relatively long proofing time requires the use of larger equipment. One problem with the use of a much higher power density in continuous proofing is that the cost of a microwave oven increases with the power level at which it is operated. The increased cost of the oven may offset the decreased proofing time.

As for continuous proofing at an intermediate power density level, it is often found that unless low levels are used portions of the dough become partially baked. Also, it takes so long for effective gassing to start that the rest period required at the end of the microwave heating to allow the completion of gassing is longer than would be expected.

The two curves which exhibit intermediate rest zones in FIG. 10 are illustrative of the application of the principles of the present invention. The dough temperature is raised to a value (approximately 100° F.) at which substantial gassing can commence. But because of the uneven heating in the dough by the time an average dough temperature of 100° F. is reached, the dough is allowed to remain at 100° F. where its temperature becomes more uniform. Gassing still continues at a relatively rapid rate because the dough is maintained at a temperature which produces rapid gassing. After the period of temperature equilibration (the slower the initial rate of rise of temperature, the longer the rest period), microwave heating commences once again to rapidly finish the proofing and raise the temperature of the dough to the final proofing temperature. Although proofing could be completed simply by allowing the dough to remain in the rest zone for a long enough period, it is much more desirable to finish the proofing rapidly with a second stage of microwave heating. The microwave heating does not begin until sufficient temperature equilibration has been reached such that at the end of the last microwave heating period there will be no hot spots and frying can begin immediately.

It is also possible to provide two rest zones with three microwave heating periods. In such a case, the power density can be slightly higher and the dough temperature rises at a faster rate during the first heating period. The first rest zone is relatively short, however, because the dough temperature is not raised as high as it is during the first heating step in the single rest zone case. During the second heating interval, the dough temperature is raised to a level higher than the rest temperature in the single rest zone case, after which there is a second rest period. During the third microwave heating period, the dough temperature is raised to the final proofing temperature. The rest zone in the single rest zone case is longer than each of the two rest zones in the two rest zone case. The reason for this is that in the single rest zone case there is a greater incremental rise in temperature during the first microwave heating period and it takes longer for the temperature of the dough to equilibrate.

In general, the number of rest zones utilized depends on the product mix. For example, in the case of a dough in which temperature "run away" is exhibited, that is, certain portions of the dough can rise very fast in temperature relative to other portions, it is better to raise the average temperature of the dough in relatively short incremental steps, separated by two or more rest zones. An example of such a mix is one which includes a fluid (e.g., jelly) filling.

The use of a moderate power density level together with one or more intermediate rest zones is often better than heating the dough to the final proofing temperature (at the same power density level) and following it with a rest period to allow the completion of proofing. For one thing, temperature runaway is prevented. For another, the total proofing time is less because significant gassing starts earlier due to the initial large incremental rise in temperature.

We have found that it is not absolutely necessary to maintain the average temperature of a dough piece at a constant level during the rest period. It is possible to heat a dough piece during the rest period and to thereby increase its average temperature provided the average temperature of the dough rises at a much slower rate than it does during the heating periods. A rest zone in which the average rate of temperature rise is less than 30 percent of the average rate of temperature rise during the heating periods is satisfactory, although preferably the rate of temperature rise should be no more than 5 percent of the rate of temperature rise during the heating periods. In the field-free zone the temperature of each dough piece equilibrates, thus eliminating hot spots. Further proofing takes place in the rest zone along with the temperature equilibration. The proofing process is facilitated if the dough pieces are heated while they are in the rest zone, although for proper temperature equilibration the rate of rise of the temperature should be within the limits specified above.

Figure 3:
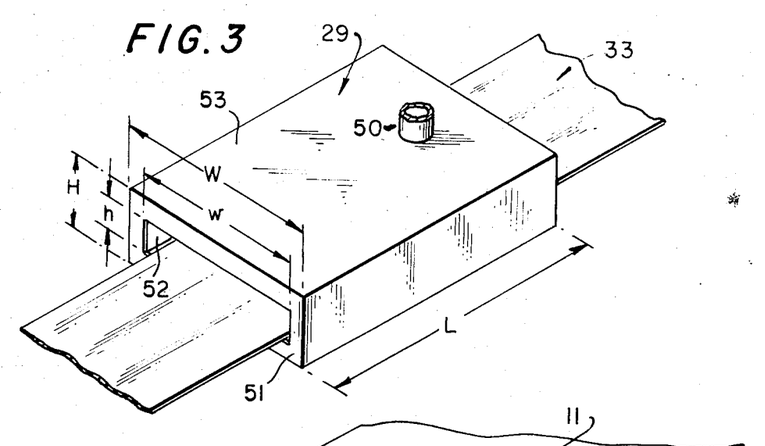
FIG. 3 is a perspective view of a trap suitable for use as trap 29 in the apparatus of FIG. 1.

FIG. 3 illustrates in greater detail the construction of intermediate trap 29 of FIGS. 1 and 2. The trap includes a metal envelope 53 having a length L, a width W and a height H. It also has an inner envelope 52 made of material transparent to microwave energy (typically, polypropylene) having a length $l$, a width $w$ and a height $h$. A metal facing plate 51 is provided at each end of the trap. A water inlet 50 is provided to fill the hollow trap with water. (It is also possible to provide an outlet so that water can be circulated through the trap.)

Because envelope 52 is transparent to microwave energy, any energy which enters the trap through the opening in end plates 51 is absorbed in the water jacket. (If dimension $h$ is less than a half wavelength, the end plates have a tendency to block energy from entering the trap; nevertheless, because the entry and exit ports of the intermediate trap are not deep, some energy does "squeeze through." Dimension $h$ should be as small as possible, the minimum dimension being determined of course by the height of the dough pieces on conveyor 33.) Dimension L is equal to the product of the conveyor velocity and the desired rest time interval. It should also be noted that the dough pieces on the conveyor at either end of the intermediate trap block microwave energy from entering the trap and thus contribute to setting up the field-free zone.

Figure 4A:
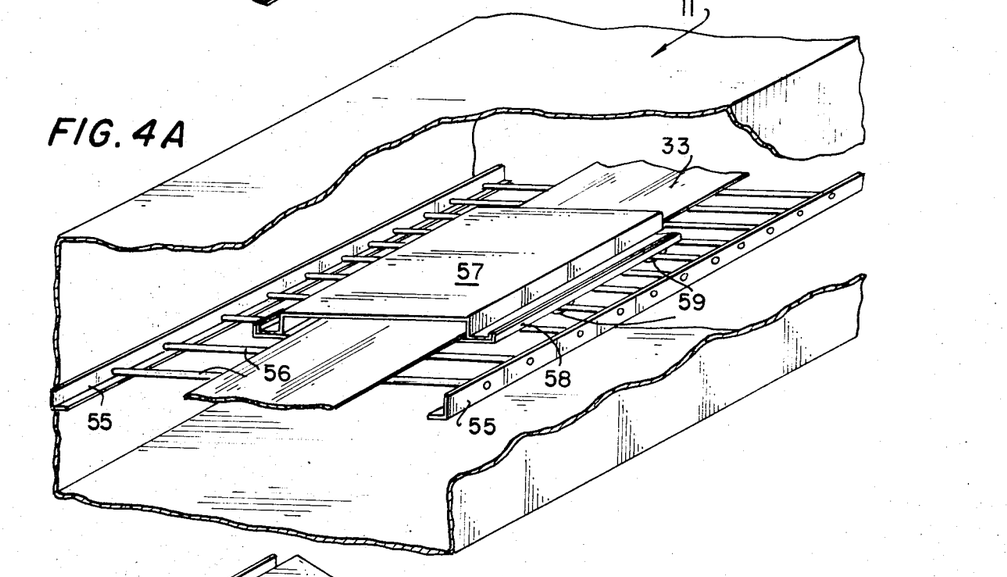
FIG. 4A is a perspective view of a second trap arrangement which can be used in the apparatus of FIG. 1.
Figure 4B:
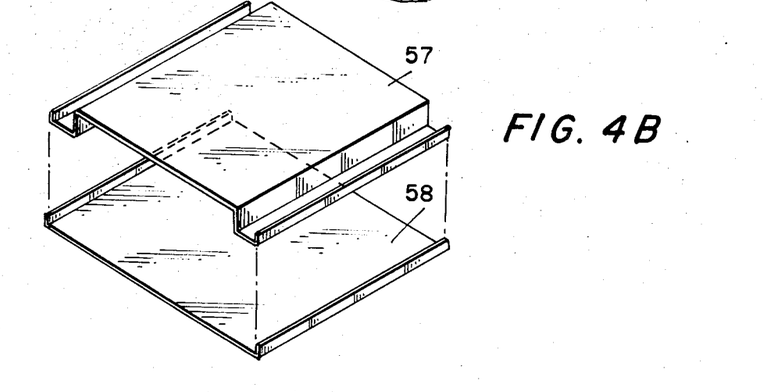
FIG. 4B illustrates the construction of the trap of FIG. 4A.

FIGS. 4A and 4B show an alternative arrangement for the intermediate trap. The trap itself consists of a bottom plate 58 and a top plate 57 having the mating lip configurations shown most clearly in FIG. 4B. When the two metal sections are placed together, they define a passage through which conveyor 33 moves, the passage being less than one-half wavelength in height. Along the two sides of the cavity 11, two brackets 55 are mounted. Extending across the two brackets are a plurality of belt support members 56, typically made of polypropylene. (This arrangement is slightly different from that shown in FIG. 1 in which belt 33 is supported on longitudinal slats 27.) A plurality of straps 59 are provided to fix section 58 to belt support members 56. The advantage of using two sections for the trap is that the trap can be cleaned easily (access is gained to the trap through access ports, not shown) simply by separating them and cleaning them individually. The trap of FIGS. 4A and 4B is easier to clean and simpler to construct than that of FIG. 3. Also, the trap does not waste power by absorbing it as does the trap of FIG. 3.

Figure 5:
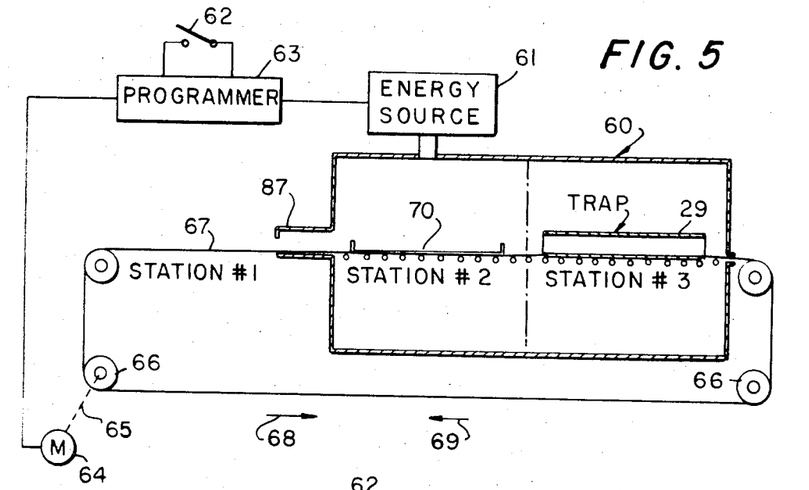
FIG. 5 is a diagrammatic longitudinal sectional view of a second illustrative embodiment of our invention.

FIG. 5 depicts a second illustrative embodiment of the invention. Conveyor 67 rotates around guide rolls 66. One of these rolls is coupled (as shown by dotted line 65) to motor 64. When start button 62 is operated, programmer 63 controls both the running of motor 64 and the turning on of an energy source 61. A tray containing dough pieces is first placed on conveyor 67 at station No. 1. The energy source is turned on by the programmer and motor 64 is turned in the forward direction so that conveyor 67 moves in the direction shown by arrow 69. The motor runs until the tray is moved to station No. 2 within cavity 60. A tray 70 is shown at station No. 2 in FIG. 5. The programmer controls both the power output of energy source 61 as well as the length of time during which tray 70 remains at station No. 2.

After the first heating period, programmer 63 causes motor 64 to advance in the forward direction so that tray 70 is moved to within trap 29 at station No. 3. After the rest interval, programmer 63 causes motor 64 to move in the reverse direction (the conveyor moves in the direction of arrow 68) to return tray 70 to station No. 2. At this time, the power output of energy source 61 raises the temperature of the dough pieces in the tray. At the end of the second heating interval, programmer 63 causes motor 64 to move in the reverse direction again so that tray 70 is returned to station No. 1, from which it is removed, following which another tray is put in place and another sequence is begun.

Figure 7:
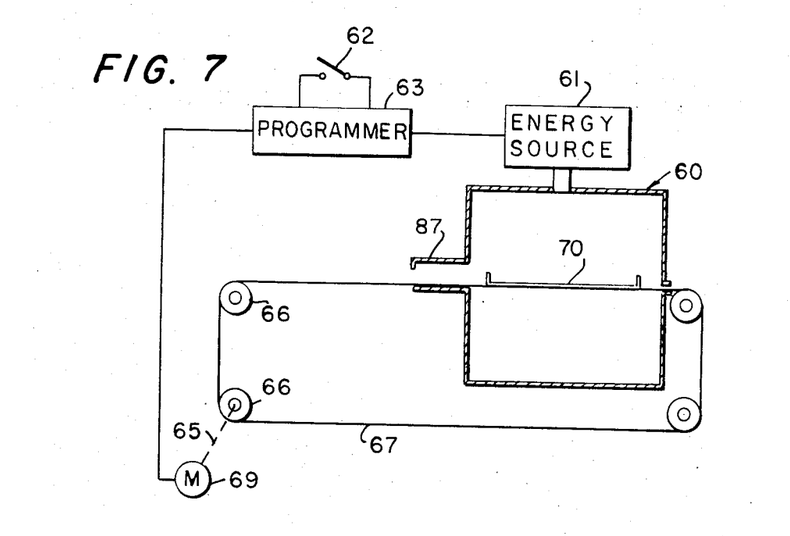
FIG. 7 is a diagrammatic longitudinal sectional view of a third illustrative embodiment of our invention.

The illustrative embodiment of FIG. 7 is similar to that of FIG. 5 except that cavity 60 does not include two stations, not does it include a trap. Programmer 63 simply causes a tray 70 to be conveyed into the cavity and then out again. While the tray is within the cavity, the temperature of the dough pieces rises during the first heating period, following which the energy source is controlled to maintain the temperature of the dough pieces approximately constant, following which the power output of the energy source is increased to raise the temperature of the dough pieces to the final level.

Figure 8:
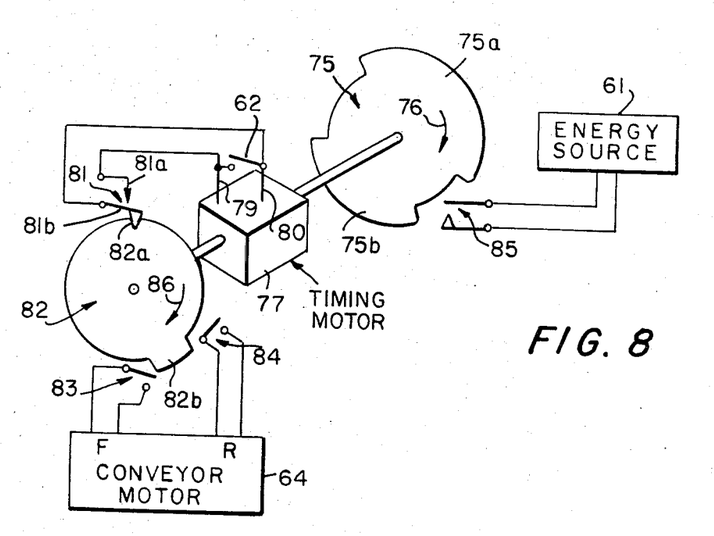
FIG. 8 depicts in further detail the manner in which the apparatus of FIG. 7 can be programmed to process the dough pieces in accordance with the principles of our invention.

FIG. 8 illustrates a typical programmer 63 which can be used for controlling the sequencing of the system shown in FIG. 7. Timer motor 77 runs as long as conductors 79, 80 are shorted together. Initially, start switch 62 is operated, the motor starts to run and the motor shaft starts to turn. As soon as cam 82 rotates sufficiently in the direction shown by arrow 86, detent 82a on the cam moves past contact 81b and contacts 81 (including contacts 81a, 81b) close. The closing of contacts 81 insures that timing motor 77 completes its cycle of operation even after starting switch 62 is opened. The timing motor continues to run until eventually detent 82a opens contacts 81.

As cam 82 starts to turn, lobe 82b closes contacts 83. The closing of these two contacts energizes the forward input of conveyor motor 64. Conveyor 67 is moved in the forward direction and a tray is conveyed into cavity 60. By the time lobe 82b moves past contacts 83 and the contacts open, the tray is within the cavity. Toward the end of the cycle, lobe 82b closes contacts 84, the reverse input of conveyor motor 64 is energized, and the motor runs in the reverse direction to move tray 70 back to the starting position. By the time contacts 84 open, the tray has been returned to the starting position. Timing motor 77 stops turning when cam 82 is in the initial position shown in FIG. 8.

At the same time that cam 82 is turned by motor 77, cam 75 is turned in the direction shown by arrow 76. After contacts 83 have opened and the tray has been moved into cavity 60, lobe 75a closes contacts 85. At this time energy source 61 is turned on. At the end of the first heating interval, when lobe 75a clears contacts 85, the contacts open and the energy source is turned off. At the end of the rest period, lobe 75b engages contacts 85 and energy source 61 is turned on once again to raise the dough pieces to the final temperature. At the end of the second heating interval, when lobe 75b clears contacts 85, the energy source is turned off. Cam 75 comes to rest in the position shown in FIg. 8 at the end of the complete cycle.

The advantages of the embodiments of the invention shown in FIGS. 5 and 7 are that only one end trap 87 is required in each case since the same port is used for both entry and exit, and the systems are relatively easy to construct (this is especially true of the system of FIG. 7). The primary disadvantage of the two systems is that only one tray can be operated upon at any time.

Figure 6:
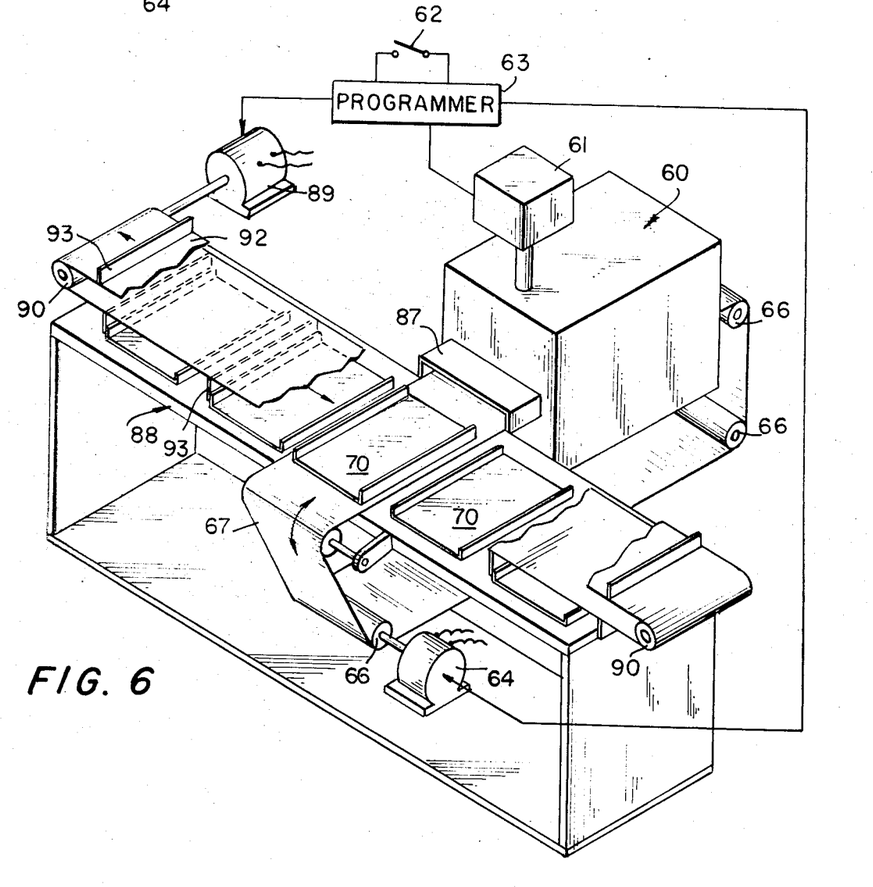
FIG. 6 is a perspective view illustrating the manner in which successive trays of dough pieces can be processed in the apparatus of FIG. 5 and the apparatus of FIG. 7.

FIG. 6 illustrates a mechanism which automates the entire sequence. As in FIG. 7, conveyor 67 moves tray 70 into and out of cavity 60 under control of programmer 63. As the trays are filled with dough pieces (the dough pieces are not shown on the trays in FIG. 6), they are placed at the left end of table 88. The programmer, in addition to controlling the operations of motor 64 and energy source 61, also controls the periodic energization of motor 89. The shaft of this motor is connected to one of the two rollers 90, around which conveyor 92 is positioned. When programmer 63 determines that a new tray should be operated upon, motor 89 operates and conveyor 92 is moved in the counter-clockwise direction in FIG. 6. The conveyor has extending from it a plurality of vanes 93. Each of these vanes, as it moves from the upper level of the conveyor to the lower level, engages a side of a tray and moves it along table 88. Each tray is thus moved by a respective vane. Motor 89 runs until the tray just returned from cavity 60 is moved off conveyor 67 and a new tray is put in place. Thereafter, motor 89 comes to a stop and motor 64 starts operating to move the new tray into cavity 60. With such a mechanism, the entire sequence is automated and trays need not be placed on conveyor 67 by hand at the start of each cycle. As the trays are moved to the right along table 88, they are conveyed to a frying unit (not shown).

Figure 9:
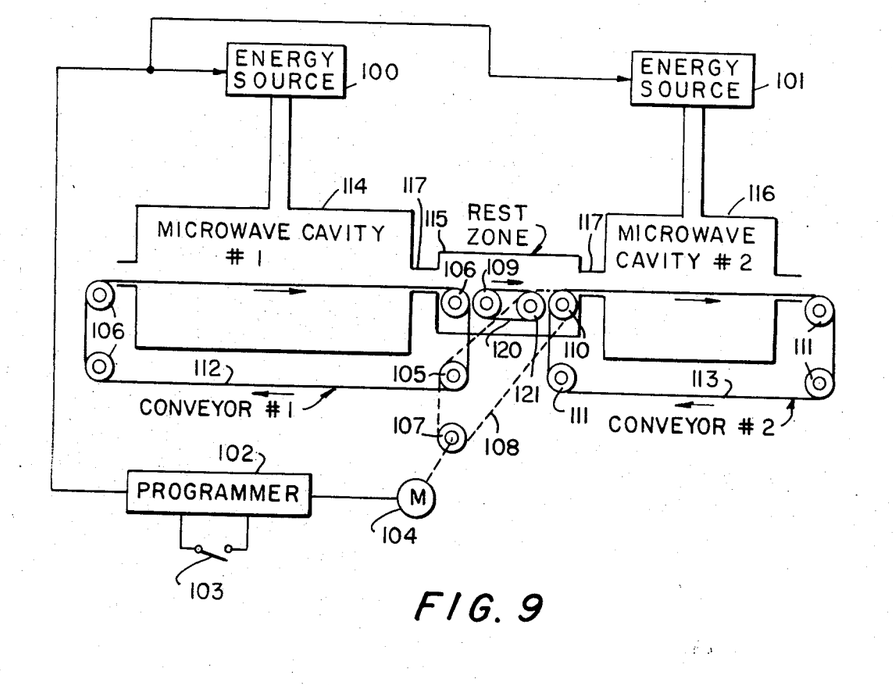
FIG. 9 is a diagrammatic longitudinal sectional view of a fourth embodiment of our invention.

FIG. 9 shows still another illustrative embodiment of the invention. Two microwave cavities 114, 116 are provided, separated by a rest zone 115. Energy source 100 is coupled to microwave cavity 114 and energy source 101 is coupled to microwave cavity 116. The rest zone is separated from the two microwave cavities by two narrow traps 117 which prevent energy from the two cavities from entering the rest zone.

Three conveyors 112, 113, 120 are provided. Conveyor 112 moves over idler rollers 106 and drive roller 105. Conveyor 120 moves over idler roller 109 and drive roller 121. Conveyor 113 moves over idler rollers 111 and drive roller 110. Motor 104 is coupled to drive roller 107, and belt 108 (shown dotted for the sake of clarity) passes around drive roller 107 and drive rollers 105, 121 and 110. When the motor is operated, all three conveyors move in the clockwise direction to transport dough pieces from left to right. Programmer 102, whose operation is initiated by start switch 103, controls both the running of motor 104 and the turning on of the two energy sources. The length of two microwave cavities, as well as the length of the rest zone, are in proportions determined by the relative durations of the two heating periods and the rest period.

The advantage of the embodiment of FIG. 9 over that of FIGS. 1 and 2 is that with separate energy sources the system is more flexible, for example, the two ovens may be operated at different frequencies and/or different power levels which may be desirable in cases such as jelly-filled doughnuts. Another advantage is that if traps 117 are made sufficiently long (and are less than a half-wavelength in height) there is no waste of power in the rest zone.

Although the invention has been described with reference to particular embodiments, it is to be understood that these embodiments are merely illustrative of the application of the principles of the invention. For example, the rest zone may be open to the air and its temperature maintained at a relatively high value with the use of infrared heating. Thus it is to be understood that numerous modification may be made in the illustrative embodiments of the invention and other arrangements may be devised without departing from the spirit and scope of the invention.

What we claim is:

1. Apparatus for proofing and maturing a yeast-leavened dough comprising high frequency cavity means, high frequency energy source means coupled to said cavity means, trap means situated in said cavity means for shielding said dough from high frequency energy when said dough is in said trap means, first control means for subjecting a dough piece in said cavity means to a high frequency field of an intensity and duration to elevate the temperature of said dough piece to a first level to initiate the substantial generation and expansion of gases therein and the partial proofing thereof, second control means for limiting the rate of rise of the average temperature of said dough piece for a rest period sufficient to permit temperature equilibration of said dough piece, and third control means for subjecting said dough piece in said cavity means to a high frequency field of an intensity and duration to elevate the temperature of said dough piece to a second level, higher than said first level, to substantially complete the proofing thereof.

2. Apparatus in accordance with claim 1 wherein the intensity of the high frequency field to which a dough piece is subjected during said rest period is sufficiently low to limit the rate of rise of the average temperature of said dough piece to less than 30 percent of the rate of rise when said dough piece is subjected to the other high frequency fields.

3. Apparatus in accordance with claim 2 wherein said rest period has a duration sufficient to allow the maximum deviation of the temperature at any point in said dough piece from the average temperature of the dough piece to be less than 20 percent at the end of said rest period.

4. Apparatus in accordance with claim 3 wherein said first control means includes means for controlling a continuous rise in the average temperature of said dough piece for 5–180 seconds and to an average temperature between 90° F. and 120° F.

5. Apparatus in accordance with claim 4 wherein said second control means includes means for controlling said rest period to have a duration of 20–180 seconds.

6. Apparatus in accordance with claim 5 wherein said third control means includes means for controlling a continuous rise in the average temperature of said dough piece to a final temperature between 100° F. and 130° F. in a time period less than 180 seconds.

7. Apparatus in accordance with claim 6 wherein the intensity of said high frequency field during said rest period is sufficiently low to limit the rate of rise of the average temperature of said dough piece to less than five percent of the rate of rise when said dough piece is subjected to the other high frequency fields, and said rest period has a duration sufficient to allow the maximum deviation of the temperature at any point in said dough piece from the average temperature of the dough piece to be less than five percent at the end of said rest period.

8. Apparatus in accordance with claim 6 wherein said cavity means includes entry port means and exit port means, and a conveyor for moving dough pieces through said entry port means into said cavity means, through said cavity means, and out of said cavity means through said exit port means, said trap means including a trap situated in the central region of said cavity means for shielding said dough pieces from high frequency energy as said dough pieces are moved along said conveyor through said trap.

9. Apparatus in accordance with claim 8 wherein said trap includes inner and outer envelopes having water therebetween, said inner envelope being transparent to high frequency energy.

10. Apparatus in accordance with claim 9 wherein the height of the opening in said trap through which said conveyor passes is less than half a wavelength of the high frequency energy within said cavity means.

11. Apparatus in accordance with claim 8 wherein said trap includes a pair of mating metal sections for defining a tunnel through which said conveyor passes.

12. Apparatus in accordance with claim 11 wherein the height of said tunnel is less than a half wavelength of the high frequency energy in said cavity means.

13. Apparatus in accordance with claim 6 wherein said cavity means includes a single dough piece entry and exit port, and a conveyor movable in two directions through said cavity means such that dough pieces placed thereon are moved through said single port in one direction into said cavity means and through sad single port in the opposite direction out of said cavity means, said cavity means having a least two stations therein, said trap means defining a trap at one station in said cavity means for sharply reducing the high frequency heating of dough pieces in said trap within said cavity means, and means for controlling said conveyor to move dough pieces in and out of said cavity means and between said at least two stations within said cavity means.

14. Apparatus for proofing and maturing a yeast-leavened dough comprising high frequency cavity means, said cavity means includes a single dough piece entry and exit port, high frequency energy source means coupled to said cavity means for providing heat thereto, control means for sequentially subjecting a dough piece in said cavity means to successive heating intervals for proofing thereof, said control means including means for providing at least one rest period between successive heating intervals in order to permit temperature equilibration of said dough piece, said control means further includes a conveyor movable in two directions through said cavity means such that dough pieces placed thereon are moved through said single port in one direction into said cavity means and through said single port in the opposite direction out of said cavity means, means for controlling said conveyor to move dough pieces in and out of said cavity means, and means for interrupting the operation of said high frequency source means during a part of the time that dough pieces are within said cavity means to permit the temperature equilibration thereof.

15. Apparatus in accordance with claim 14 further including means for placing successive trays of dough pieces on said conveyor prior to the conveying thereof into said cavity means and for removing successive trays of dough pieces from said conveyor following the conveying thereof out of said cavity means.

16. Apparatus for proofing and maturing a yeast-leavened dough comprising high frequency cavity means, said cavity means including at least two stations, high frequency energy source means coupled to said cavity means for providing heat thereto, a trap situated in said cavity means for shielding said dough from high frequency energy when said dough is in said trap, and control means for sequentially subjecting a dough piece in said cavity means to successive heating intervals for proofing thereof, said control means including means for providing at least one rest period between successive heating intervals in order to permit temperature equilibration of said dough piece.

17. Apparatus in accordance with claim 16 wherein said control means includes means for providing a power density within said cavity means, when said dough piece is subjected to a high frequency field, of a magnitude in the range 0.128–12.4 watts/gm as measured by the heating of conductivity water.

18. Apparatus in accordance with claim 16 wherein said control means includes means for providing a power density within said cavity means, when said dough piece is subjected to a high frequency field, of a magnitude in the range 0.293–1.55 watts/gm as measured by the heating of conductivity water.

19. Apparatus for proofing and maturing a yeast-leavened dough comprising high frequency cavity means, said cavity means includes entry port means and exit port means, high frequency energy source means coupled to said cavity means for providing heat thereto, control means for sequentially subjecting a dough piece in said cavity means to successive heating intervals for proofing thereof, said control means including means for providing at least one rest period between successive heating intervals in order to permit temperature equilibration of said dough piece, said control means further includes a conveyor for moving dough pieces through said entry port means into said cavity means, through said cavity means, and out of said cavity means through said exit port means, and a trap situated in the central region of said cavity means for shielding said dough pieces from high frequency energy as said dough pieces are moved along said conveyor through said trap.

20. Apparatus in accordance with claim 19 wherein said trap includes inner and outer envelopes having water therebetween, said inner envelope being transparent to high frequency energy.

21. Apparatus in accordance with claim 20 wherein the height of the opening in said trap through which said conveyor passes is less than half a wavelength of the high frequency energy within said cavity means.

22. Apparatus in accordance with claim 21 wherein the intensity of said high frequency field during said rest period is sufficiently low to limit the rate of rise of the average temperature of said dough piece to less than 30 percent of the rate of rise when said dough piece is subjected to the other high frequency fields, and said rest period has a duration sufficient to allow the maximum deviation of the temperature at any point in said dough piece from the average temperature of the dough piece to be less than 20 percent at the end of said rest period.

23. Apparatus in accordance with claim 22 wherein said trap includes a pair of mating metal sections for defining a tunnel through which said conveyor passes.

24. Apparatus in accordance with claim 23 wherein the height of said tunnel is less than a half wavelength of the high frequency energy in said cavity means.

25. Apparatus in accordance with claim 24 wherein the intensity of said high frequency field during said rest period is sufficiently low to limit the rate of rise of the average temperature of said dough piece to less than 30 percent of the rate of rise when said dough piece is subjected to the other high frequency fields, and said rest period has a duration sufficient to allow the maximum deviation of the temperature at any point in said dough piece from the average temperature of the dough piece to be less than 20 percent at the end of said rest period.

26. Apparatus for proofing and maturing a yeast-leavened dough comprising high frequency cavity means, said cavity means includes a single dough piece entry and exit port, high frequency energy source means coupled to said cavity means for providing heat thereto, a conveyor movable in two directions through said cavity means such that dough pieces placed thereon are moved through said single port in one direction into said cavity means and through said single port in the opposite direction out of said cavity means, said cavity means having at least two stations therein, means defining a trap at one station in said cavity means for sharply reducing the high frequency heating of dough pieces in said trap within said cavity means, means for controlling said conveyor to move dough pieces in and out of said cavity means and between said at least two stations within said cavity means, and control means for sequentially subjecting a dough piece in said cavity means to successive heating intervals for proofing thereof, said control means including means for providing at least one rest period between successive heating intervals in order to permit temperature equilibration of said dough piece.

27. Apparatus in accordance with claim 26 wherein the intensity of said high frequency field during said rest period is sufficiently low to limit the rate of rise of the average temperature of said dough piece to less than 30 percent of the rate of rise when said dough piece is subjected to the other high frequency fields, and said rest period has a duration sufficient to allow the maximum deviation of the temperature at any point in said dough piece from the average temperature of the dough piece to be less than 20 percent at the end of said rest period.

28. Apparatus in accordance with claim 26 further including means for placing successive trays of dough pieces on said conveyor prior to the conveying thereof into said cavity means and for removing successive trays of dough pieces from said conveyor following the conveying thereof out of said cavity means.

29. Apparatus for proofing and maturing a yeast-leavened dough comprising high frequency cavity means, high frequency energy source means coupled to said cavity means for providing heat thereto, said cavity means includes first and second high frequency cavities and said high frequency energy source means includes first and second energy source means coupled to said first and second cavities, and a conveyor for transporting dough pieces through said first cavity and then through said second cavity, and means for establishing a region substantially free of high frequency energy between said first and second cavities through which said conveyor moves said dough pieces, and control means for sequentially subjecting a dough piece in said cavity means to successive heating intervals for proofing thereof, said control means including means for providing at least one rest period between successive heating intervals in order to permit temperature equilibration of said dough piece.

30. Apparatus in accordance with claim 29 wherein the length of said first and second cavities and the length of said energy-free region are in proportions determined by the durations of the heating periods and the intermediate rest period of each dough piece.

31. Apparatus in accordance with claim 29 wherein the intensity of said high frequency field during said rest period is sufficiently low to limit the rate of rise of the average temperature of said dough piece to less than 30 percent of the rate of rise when said dough piece is subjected to the other high frequency fields, and said rest period has a duration sufficient to allow the maximum deviation of the temperature at any point in said dough piece from the average temperature of the dough piece to be less than 20 percent at the end of said rest period.

32. Apparatus in accordance with claim 16 wherein said energy source means operates in the microwave region and wherein said control means includes means for controlling the field density in said cavity means such that said dough piece is subjected to a power density in the range 0.089–9.7 watts/gm during said heating intervals.

33. Apparatus in accordance with claim 16 wherein said energy source means operates in the microwave region and wherein said control means including means for controlling the field density in said cavity means such that said dough piece is subjected to a power density in the range 0.202–1.08 watts/gm during said heating intervals.

34. Apparatus for proofing and maturing yeast-leavened dough comprising microwave cavity means, microwave energy source means coupled to said microwave cavity means, trap means including a trap situated in said microwave cavity means for shielding said dough from microwave energy when said dough is in said trap, and control means for successively controlling the heating of a dough piece in said microwave cavity means by a microwave field of an intensity in the range 0.128–12.4 watts/gm as measured in conductivity water for a total time interval sufficient to elevate the temperature of said dough piece to the range 100°–130° F. for governing the substantial generation and expansion of gases in the dough piece and the proofing thereof, and for secondly limiting the heating of said dough piece by said microwave field during at least one rest period between successive heating intervals to allow the maximum deviation of the temperature at any point in said dough piece from the average temperature of the dough piece to be reduced to less than 20 percent.

35. Apparatus in accordance with claim 34 wherein the intensity of the microwave field to which a dough piece is subjected during said at least one rest period is sufficiently low to limit the rate of rise of the average temperature of said dough piece to less than 30 percent of the rate of rise when said dough piece is subjected to said microwave field having an intensity in said range.

36. Apparatus in accordance with claim 35 wherein said control means includes means for controlling a continuous rise in the average temperature of said dough piece for 5–180 seconds and the first of said at least one rest period has a duration of at least 20 seconds.

37. Apparatus for proofing and maturing a yeast-leavened dough in accordance with claim 35 wherein said microwave field has an intensity in the range 0.293–1.55 watts/gm as measured in conductivity water.

38. Apparatus for proofing and maturing a yeast-leavened dough comprising microwave cavity means including entry port means and exit port means, microwave energy source means coupled to said microwave cavity means, conveyor means for moving dough pieces through said entry port means into said cavity means and out of said cavity means through said exit port means, and at least one trap situated in the central region of said cavity means for shielding dough pieces from microwave energy as said dough pieces are moved along by said conveyor means through said at least one trap.

39. Apparatus in accordance with claim 38 wherein the intensity of the microwave field to which a dough piece is subjected while it is conveyed through said at least one trap is sufficiently low to limit the rate of rise of the average temperature of the dough piece to less than 30 percent of the rate of rise when the dough piece is subjected to a microwave field both before it enters said at least one trap and after it leaves said at least one trap within said cavity means.

40. Apparatus in accordance with claim 39 wherein said at least one trap includes inner and outer envelopes having water therebetween, said inner envelope being transparent to microwave energy and the height of the opening in said at least one trap through which said dough pieces are moved being less than half the wavelength of the microwave energy in said cavity means.

41. Apparatus in accordance with claim 40 wherein said microwave energy source means produces a power intensity in said cavity means exterior to said at least one trap in the range 0.293–1.55 watts/gm as measured in conductivity water.

42. Apparatus in accordance with claim 39 wherein said at least one trap includes a pair of mating metal sections for defining a tunnel through which said conveyor means passes, the height of said tunnel being less than half the wavelength of the microwave energy in said cavity means.

43. Apparatus in accordance with claim 42 wherein said microwave energy source means produces a power intensity in said cavity means exterior to said at least one trap in the range 0.293–1.55 watts/gm as measured in conductivity water.

44. Apparatus for proofing and maturing yeast-leavened dough comprising microwave cavity means having entry/exit port means, microwave energy source means coupled to said microwave cavity means, conveyor means for moving dough pieces into and out of said cavity means through said entry/exit port means, said cavity means having at least two stations therein, and means defining a trap at one station in said cavity means for sharply reducing the heating of the dough pieces in said trap within said cavity means.

45. Apparatus in accordance with claim 44 wherein said microwave energy source means produces a power intensity in said cavity means in the range 0.293–1.55 watts/gm as measured in conductivity water and the intensity of the microwave field in said trap is sufficiently low to limit the rate of rise of the average temperature of a dough piece to less than 30 percent of the rate of rise when the dough piece is subjected to a microwave field exterior to said trap within said cavity means.

46. Apparatus for proofing and maturing yeast-leavened dough comprising first and second microwave cavities, microwave energy source means for producing a heating effect in each of said first and second microwave cavities in the range 0.293–1.55 watts/gm as measured in conductivity water, conveyor means for transporting dough pieces through said first and second cavities in sequence, and a means for establishing region substantially free of microwave energy between said first and second cavities through which said conveyor means moves said dough pieces after they exit said first cavity and before they enter said second cavity, said conveyor means moving said dough pieces through said region during a time period sufficient to allow the maximum deviation of the temperature at any point in a dough piece from the average temperature of the dough piece to be reduced to less than 20 percent.

* * * * *